United States Patent
Lin et al.

(10) Patent No.: US 9,817,503 B2
(45) Date of Patent: Nov. 14, 2017

(54) THIN FILM TRANSISTOR SUBSTRATE AND IN-CELL TOUCH DISPLAY PANEL USING SAME

(71) Applicant: HON HAI PRECISION INDUSTRY CO., LTD., New Taipei (TW)

(72) Inventors: Chien-Wen Lin, New Taipei (TW); Yu-Fu Weng, New Taipei (TW); Chia-Lin Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/013,072

(22) Filed: Feb. 2, 2016

(65) Prior Publication Data
US 2016/0240560 A1    Aug. 18, 2016

Related U.S. Application Data

(60) Provisional application No. 62/115,657, filed on Feb. 13, 2015.

(51) Int. Cl.
| G06F 3/041 | (2006.01) |
| G02F 1/1333 | (2006.01) |
| G06F 3/044 | (2006.01) |
| H01L 27/04 | (2006.01) |

(52) U.S. Cl.
CPC ........ *G06F 3/0412* (2013.01); *G02F 1/13338* (2013.01); *G06F 3/044* (2013.01); *G06F 2203/04103* (2013.01); *G06F 2203/04112* (2013.01)

(58) Field of Classification Search
None
See application file for complete search history.

(56) References Cited

U.S. PATENT DOCUMENTS

| 2011/0227851 A1* | 9/2011 | Oh ...................... G02F 1/13338 345/173 |
| 2011/0228189 A1* | 9/2011 | Oh ...................... G02F 1/13338 349/43 |
| 2015/0062451 A1* | 3/2015 | Ono ................... G02F 1/136227 349/12 |
| 2015/0097192 A1* | 4/2015 | Araki .................... G06F 3/0412 257/72 |
| 2015/0378486 A1* | 12/2015 | Yu ........................ G06F 3/0412 345/174 |

* cited by examiner

*Primary Examiner* — Hoang-Quan Ho
(74) *Attorney, Agent, or Firm* — Steven Reiss (57) ABSTRACT

The present disclosure provides a thin film transistor (TFT) substrate. The TFT substrate includes a first metal layer, a second metal layer, a first transparent layer, a third metal layer, and a second transparent layer. The first metal layer includes at least one gate electrode. The second metal layer is insulated to the first metal layer and includes at least one source electrode and at least one drain electrode. The first transparent layer is insulated to the first metal layer and the second metal layer. The first transparent layer includes at least one common electrode layer. The third metal layer includes a plurality of metal wires electrically connected to the common electrode layer. The second transparent layer includes a plurality of transparent conductive wires electrically connected to the drain electrode. The metal wires and the transparent conductive wires form a touch sensing structure configured to detect touch operations.

14 Claims, 14 Drawing Sheets

THIN FILM TRANSISTOR SUBSTRATE AND IN-CELL TOUCH DISPLAY PANEL USING SAME

CROSS-REFERENCE TO RELATED APPLICATIONS

This application claims priority from Ser. No. 62/115,657 field Feb. 13, 2015, which is incorporated herein by reference.

FIELD

The subject matter herein generally relates to a thin film transistor substrate and an in-cell touch display panel using the thin film transistor substrate.

BACKGROUND

In-cell touch display technology is an important technology in touch sensing field. An in-cell touch display panel is thinner than an exterior touch display panel, and has a better user experience.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Figure 1:
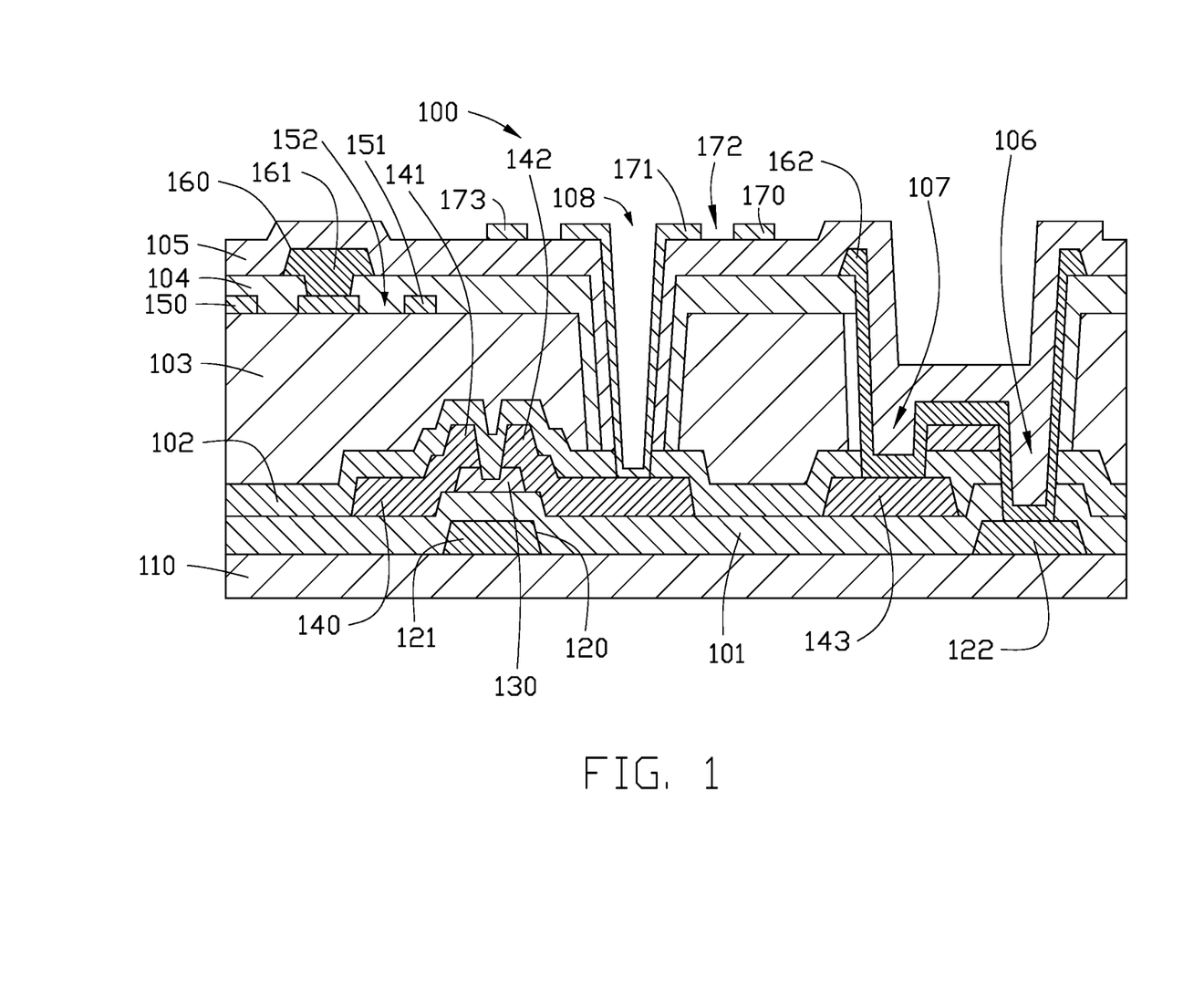
FIG. 1 is a cross-sectional view of a thin film transistor substrate of an in-cell touch display panel according to an embodiment of the present disclosure.

The present disclosure provides an in-cell touch display panel. The in-cell touch display panel may be a liquid crystal display panel. The in-cell touch display panel includes a thin film transistor (TFT) substrate 100. Referring to FIG. 1, FIG. 1 is a cross-sectional view of the thin film transistor substrate 100 of the in-cell touch display panel according to an optimization embodiment of the present disclosure. The cross-sectional view just shows a part (such as a pixel) of the TFT substrate 100. The TFT substrate 100 may include a combine of a plurality of the part of the TFT substrate 100 shown in FIG. 1.

The TFT substrate 100 includes a substrate 110, a first metal layer 120 formed on the substrate 110, a first insulation layer 101, a semiconductor layer 130, a second metal layer 140 formed on the semiconductor layer 130 and the first insulation layer 101, a second insulation layer 102 covered the second metal 140, the semiconductor layer 130, and the first insulation layer 101, a third insulation layer 103 formed on the second insulation layer 102, a first transparent layer 150 formed on the third insulation layer 103, a fourth insulation layer 104 covered the first transparent layer 150 and the third insulation layer 103, a third metal layer 160 formed on the fourth insulation layer 104, a fifth insulation layer 105 covered the third metal layer 160, and a second transparent layer 170 formed on the fifth insulation layer 105.

The first metal layer 120 includes a gate electrode 121, a gate line (not shown) electrically connected to the gate electrode 121, and a first storage capacitor electrode 122. The first insulation layer 101 is a gate insulation layer. The semiconductor layer 130 is disposed opposite to the gate electrode 121. The second metal layer 140 includes a source electrode 141, a drain electrode 142, a data line (not shown) electrically connected to the source electrode 141, and a second storage capacitor electrode 143. The source electrode 141 and the drain electrode 142 electrically connected two ends of the semiconductor layer 130 respectively. The source electrode 141, the drain electrode 142, the semiconductor layer 130, and the gate electrode 121 constitute a TFT. The TFT switches one of pixels of the TFT substrate 100. The first metal layer 120, the second metal layer 140, and the third metal layer 160 are made of non-transparent metal materials. The first transparent layer 150 and the second transparent layer 170 include indium tin oxide (ITO) or indium zinc oxide (IZO).

In this embodiment, the first transparent layer 150 is a common electrode layer. The common electrode layer includes a plurality of main electrodes 151 and a plurality of slit 152 disposed between two adjacent main electrodes 151. The third metal layer 160 includes a plurality of metal wires 161 and a third storage capacitor electrode 162 (FIG. 1 just shows a part of the third metal layer 160). The third storage capacitor electrode 162 electrically connects to the first storage capacitor electrode 122 through a hole 106 which is through the first insulation layer 101 and the second insulation layer 102. The third storage capacitor electrode 162 further electrically connects to the second storage capacitor electrode 143 through a hole 107 which is through the second insulation layer 102. The second transparent layer 170 includes a pixel electrode 171 and a plurality of transparent conductive wires 173. The pixel electrode 171 defines a plurality of slits 172. The pixel electrode 171 and the common electrode layer form a horizontal electric field and control liquid crystals switch in a plane. The pixel electrode 171 further electrically connects to the drain electrode 142 through a hole 108 which is through the second insulation layer 102, the third insulation layer 103, the fourth insulation layer 104, and the fifth insulation layer 105. The transparent conductive wires 173 and the metal wires 161 form a touch sensing layer. The touch sensing layer is configured to detect touch operations applied on the in-cell touch display panel.

Figure 2:
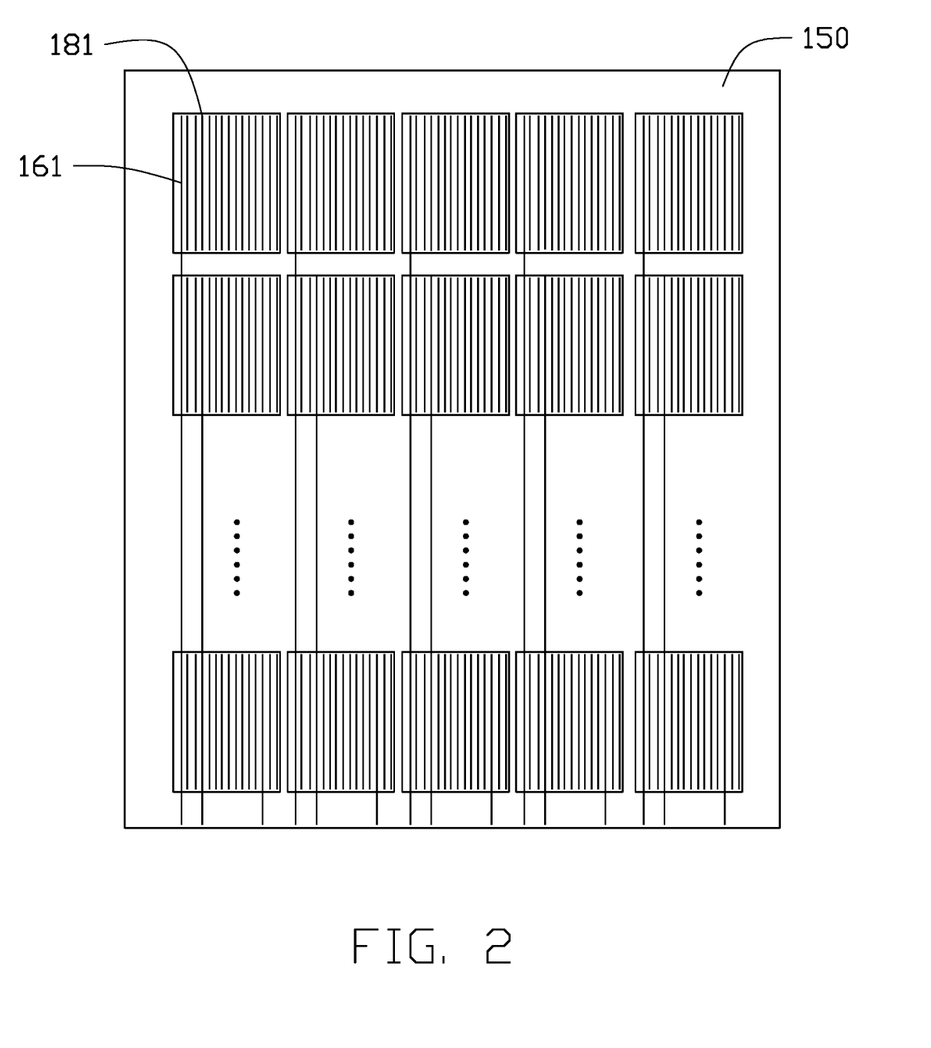
FIG. 2 is a plan view of metal wires of a third metal layer of the thin film transistor substrate.

FIG. 2 is a plan view of metal wires 161 of the third metal layer 160. Referring to FIG. 2, the third metal layer 160 defines a plurality of touch sensor areas 181. Each of the touch sensor areas 181 is a rectangle roughly. The touch sensor areas 181 are arranged in a matrix and interval from each other. Each of the touch sensor areas 181 includes a plurality of metal wires 161 extended along a first direction X. The metal wires 161 have roughly same lengths, and distances between any two adjacent metal wires 161 are roughly same.

Figure 3:
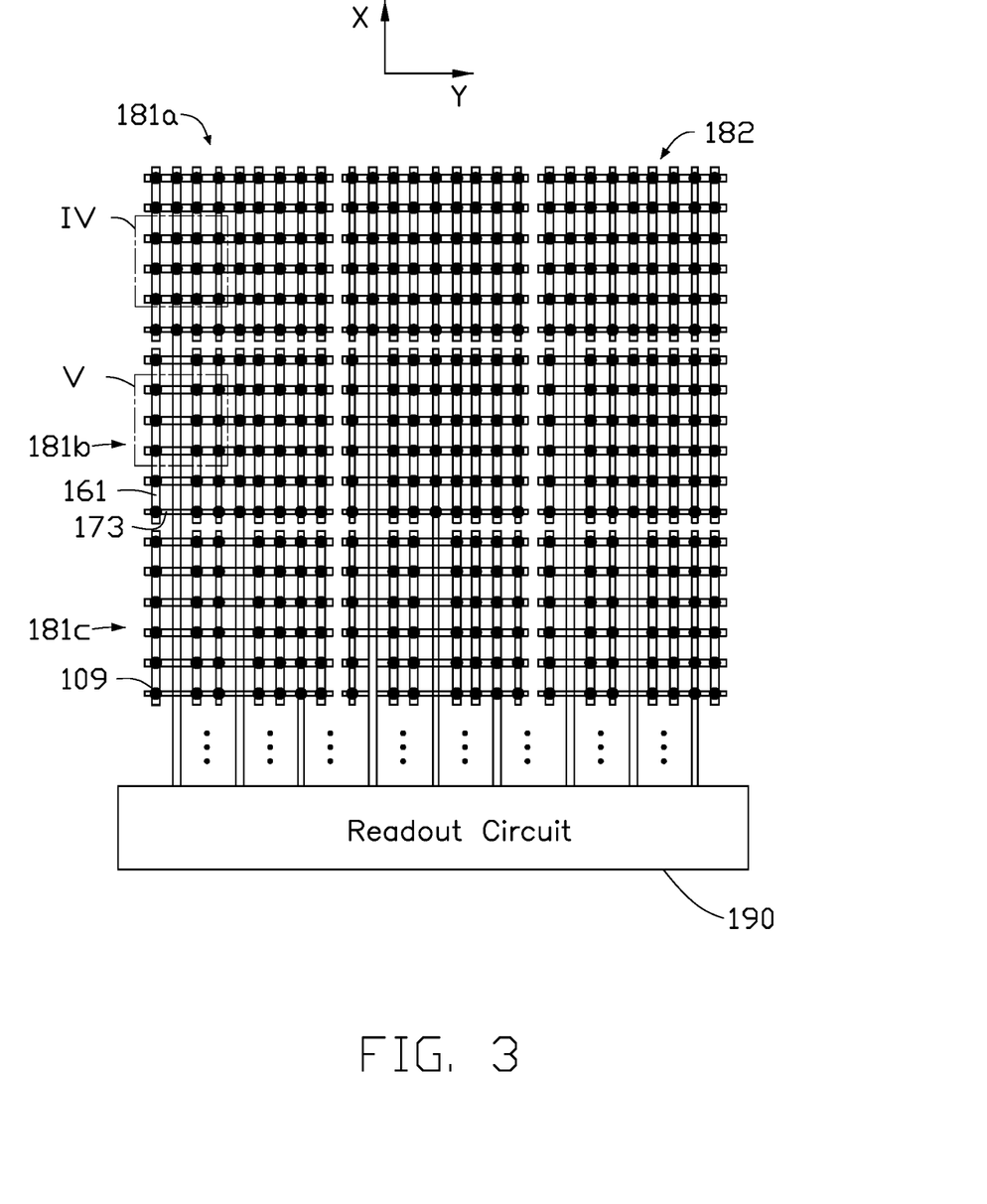
FIG. 3 is a plan view of the metal wires and transparent conductive wires.

FIG. 3 is a plan view of the metal wires 161 of a third metal layer 160 and the transparent conductive wires 173 of the second transparent layer 170. Referring to FIG. 3, each of the touch sensor areas 181 includes a plurality of transparent conductive wires 173 extended along a second direction Y. The second direction Y is perpendicular to the first direction X. In each touch sensor area 181, the transparent conductive wires 173 and the metal wires 161 are arranged across and defined a plurality of touch sensors 182. The touch sensors 182 form a self-inductance touch sensing structure and configured to detect touch operations applied on the in-cell touch display panel. The transparent conductive wires 173 and the metal wires 161 are electrically connected through a hole 109 which is through the fifth insulation layer 105 and corresponding to an infall of the transparent conductive wires 173 and the metal wires 161.

Figure 4:
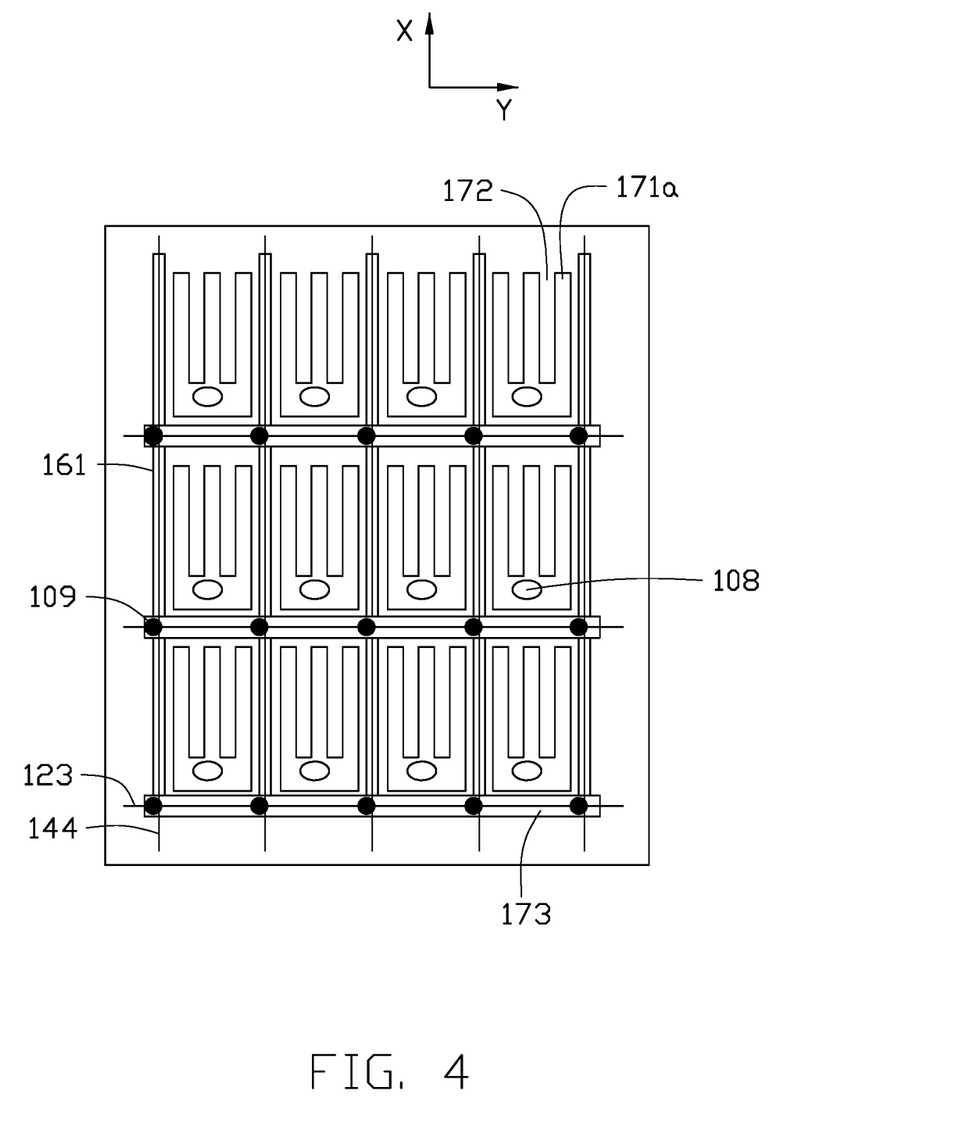
FIG. 4 is an enlarged view of a portion of FIG. 3 designated by box IV.

FIG. 4 is an enlarged view of a portion of FIG. 3 designated by box IV. The boxed portion IV corresponds to a first touch sensor area 181a. Referring to FIG. 4, each pixel electrode 171 includes a plurality of pectinate main electrodes 171a and a plurality of slits 172 defined between two adjacent main electrodes 171a. The main electrodes 171a electrically connected to the drain electrode 142 through a hole 108 which is through the second insulation layer 102, the third insulation layer 103, the fourth insulation layer 104, and the fifth insulation layer 105. Each of the pixels is defined by two adjacent gate lines 123 and two adjacent data lines 144. In this embodiment, the metal wires 161 are located above the data lines 144. In this embodiment, the transparent conductive wires 173 are located above the gate line 123.

Figure 5:
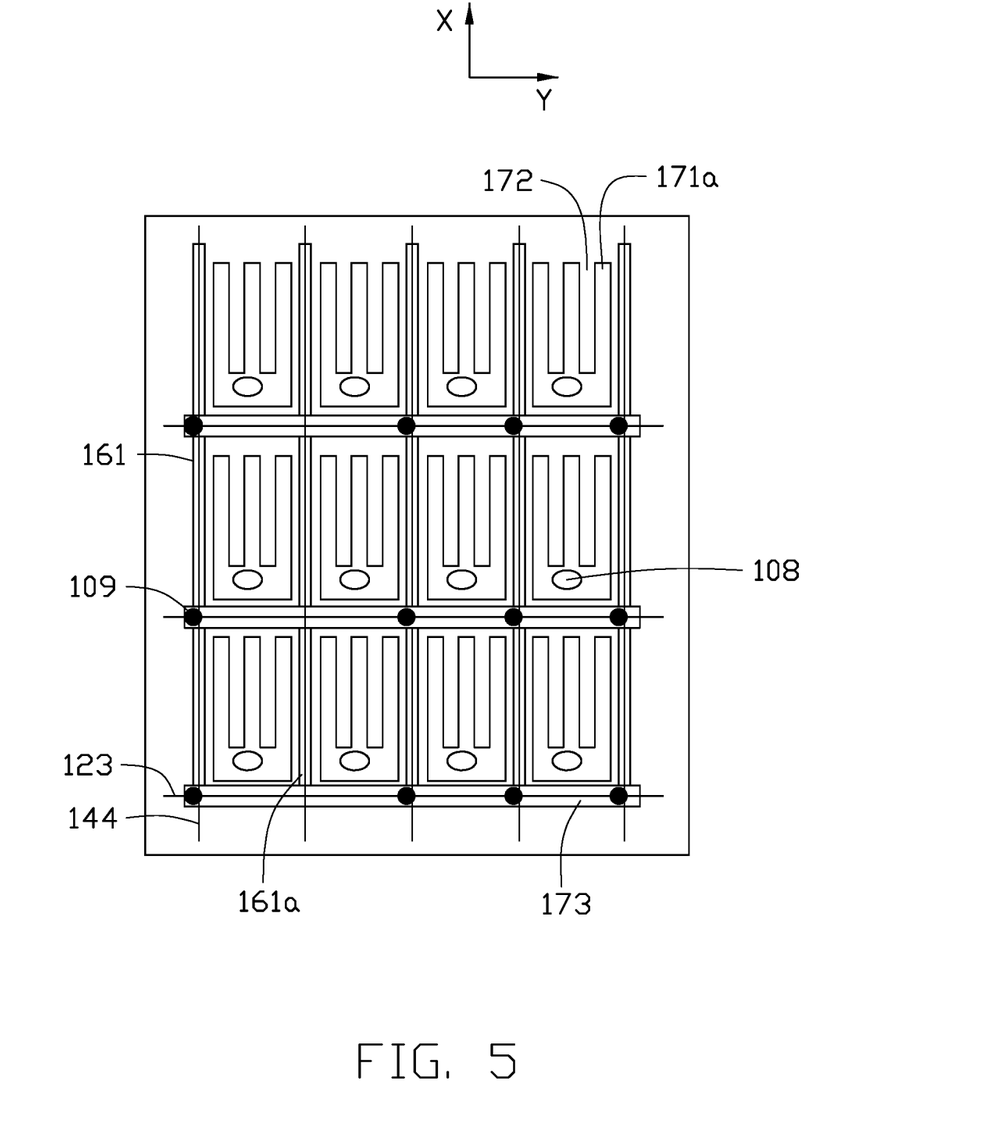
FIG. 5 is an enlarged view of a portion of FIG. 3 designated by box V.

FIG. 5 is an enlarged view of a portion of FIG. 3 designated by box V. The boxed portion V corresponds to a second touch sensor area 181b which is in the same line with the first touch sensor area 181a. Referring to FIG. 5, each pixel electrode 171 includes a plurality of pectinate main electrodes 171a and a plurality of slits 172 defined between two adjacent main electrodes 171a. The main electrodes 171a electrically connects to the drain electrode 142 through the hole 108 which is through the second insulation layer 102, the third insulation layer 103, the fourth insulation layer 104, and the fifth insulation layer 105. Each of the pixels is defined by two adjacent gate lines 123 and two adjacent data lines 144. In this embodiment, a extend direction of the metal wires 161 is same with a extend direction of the data lines 144. The metal wires 161 are located above the data lines 144. A extend direction of the transparent conductive line 173 is same with a extend direction of the gate electrode 123. The transparent conductive line 173 is located above the gate electrode line 123. In FIG. 5, at least one of the metal wires 161 of the second touch sensor areas 181b is not electrically connected to a transparent conductive wire 173 above the at least one of the second touch sensor areas 181b. The at least one of the metal wires 161 extends from one of the metal wires 161 of the first touch sensor area 181a. The at least one of the metal wires 161 is configured to electrically connect to the touch sensor 182 of the first touch sensor area 181a to a readout circuit 190. The readout circuit 190 detects a touch operation position. A third touch sensor area 181c which is in the same line with the first touch sensor area 181a also includes the metal wires 161 which are electrically connected to the transparent conductive wires 173. The metal wires 161 extend from the metal wires 161 of the third touch sensor area 181c. The metal wires 161 are configured to electrically connect to the touch sensor 182 of the third touch sensor area 181c to a readout circuit 190. The readout circuit 190 detects a touch operation position. The readout circuit 190 is disposed below the touch sensors 182. When viewed from the second direction Y, a number of metal wires 161a, which are not electrically connected to the transparent conductive wires 173 above the metal wires 161a, are increased in the touch sensor areas 181. For example, the second touch sensor area 181b includes a metal wire 161a configured to electrically connect the first touch sensor area 181a to the readout circuit 190. The third touch sensor area 181c includes a metal wire 161a configured to electrically connect the first touch sensor area 181a to the readout circuit 190 and another metal wire 161a configured to electrically connect the second touch sensor area 181b to the readout circuit 190. The touch sensors 182 form a self-inductance touch sensing structure.

Figure 6:
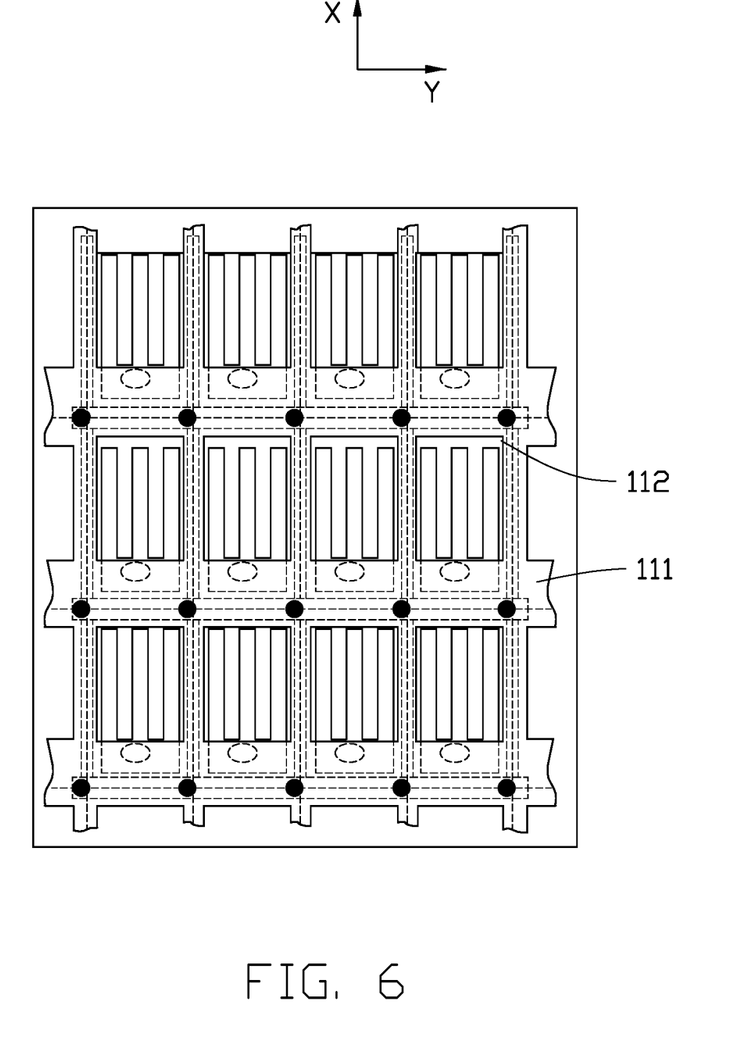
FIG. 6 is a plan view of a black matrix of the in-cell touch display panel.

The in-cell touch display panel further includes a black matrix 111. FIG. 6 is a plan view of the black matrix. Referring to FIG. 6, the black matrix 111 defines a plurality of open areas 112 corresponding to the slit 112 of the pixels. In a plan view, the black matrix 111 roughly covers the gate lines 123, the data lines 144, the metal wires 161, and the transparent conductive wires 173. The metal wires 161 are completely covered by the black matrix 111, thus an aperture ratio of the in-cell touch display panel is not reduced.

In this embodiment, the pixel electrode 171 and the transparent conductive wires 173 are patterned in the same mask. Thus, the transparent conductive wires 173 do not need redundant processes and mask, and is easy to be formed. In other embodiments, the pixel electrode 171 and the transparent conductive wires 173 can be patterned in different masks.

In this embodiment, the metal wires 161 and the third storage capacitor electrode 162 are patterned in the same mask. Thus, the metal wires 161 do not need redundant processes and mask, and is easy to be formed. In other embodiments, the metal wires 161 and the third storage capacitor electrode 162 can be patterned in different masks.

Figure 7:
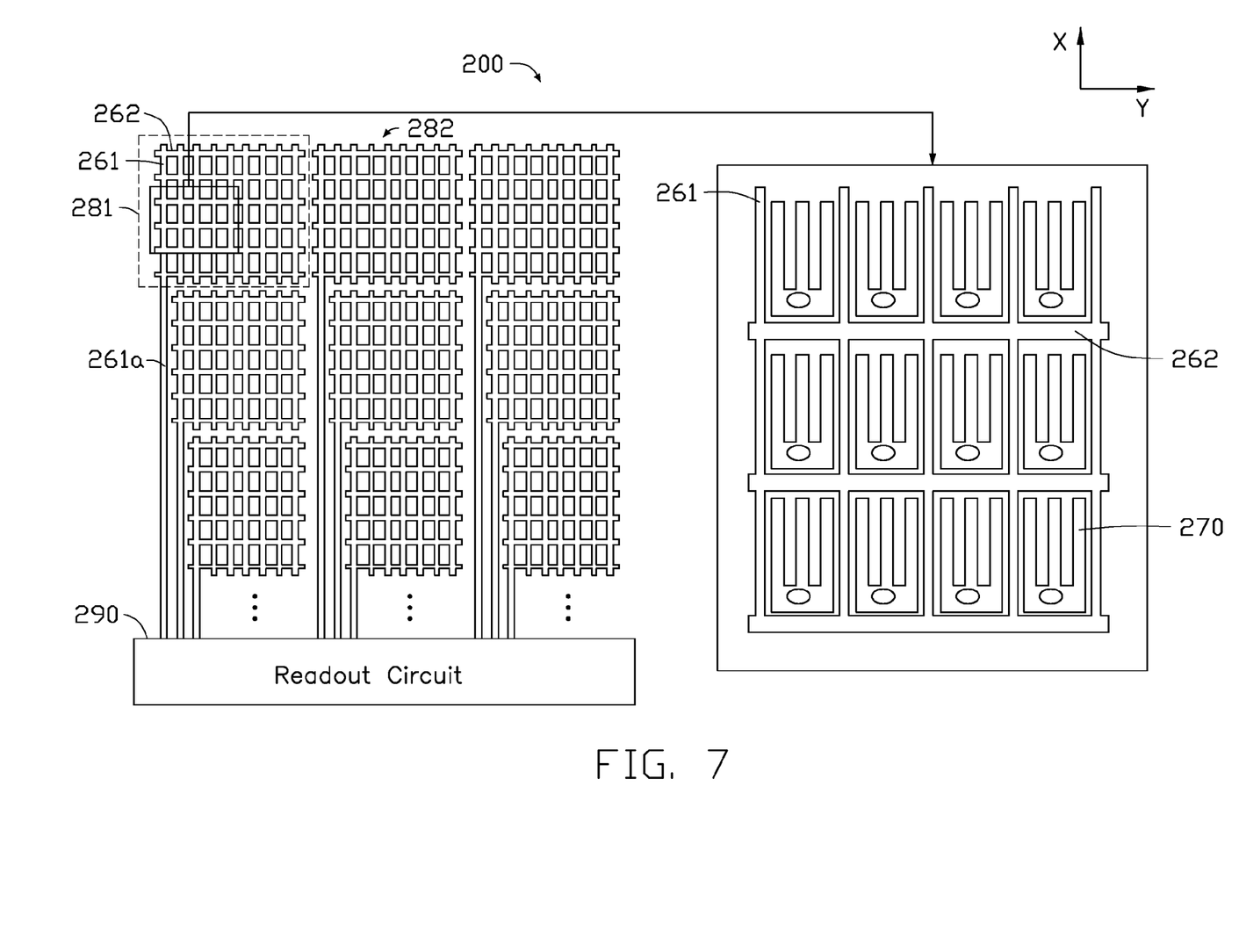
FIG. 7 and FIG. 8 are plan views of a thin film transistor substrate of the in-cell touch display panel according to a second embodiment of the present disclosure.
Figure 8:
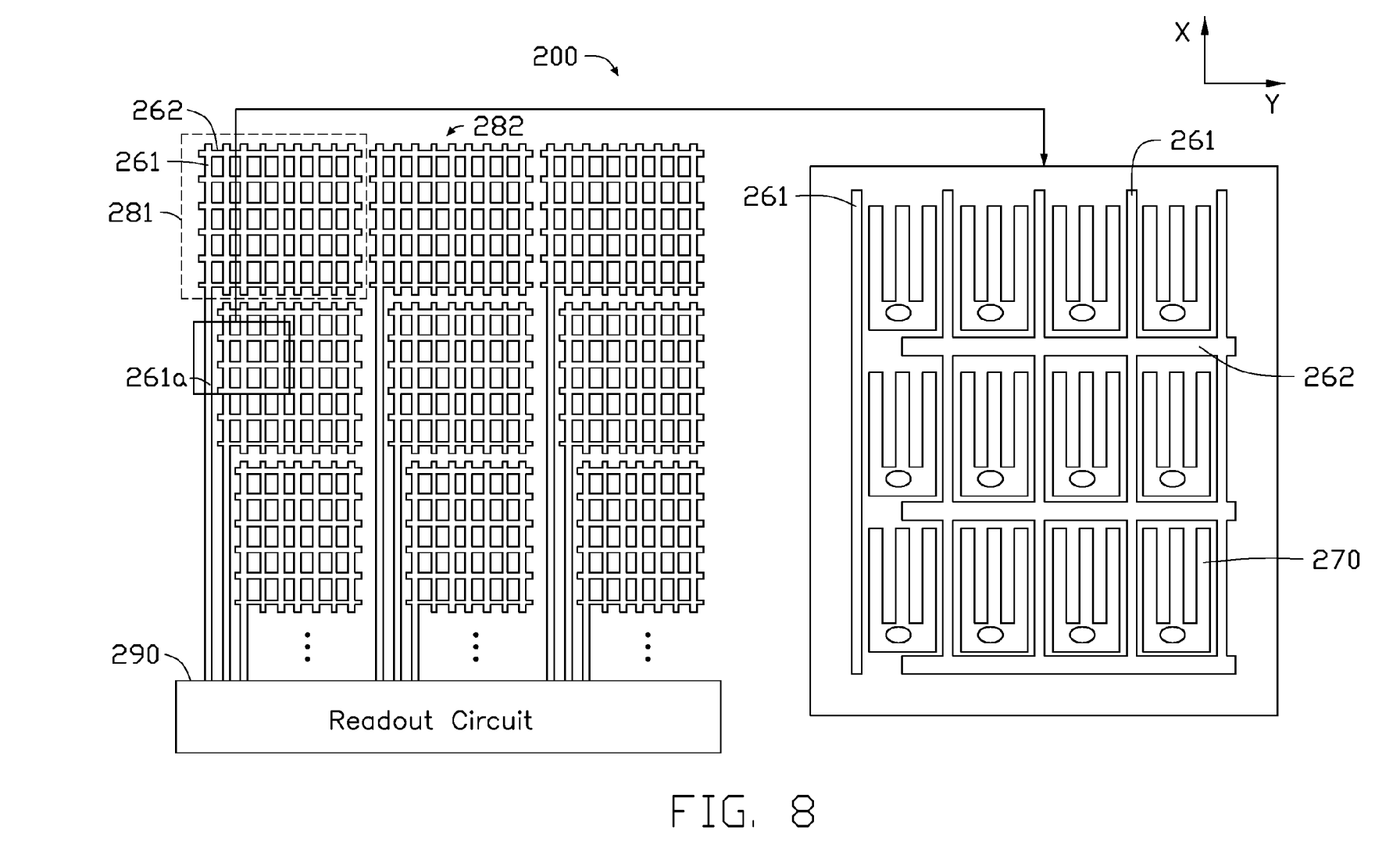

FIG. 7 and FIG. 8 are plan views of a thin film transistor substrate 200 of the in-cell touch display panel according to a second embodiment of the present disclosure. A right-hand portion is an enlarged view of a left-hand portion on each of the FIG. 7 and FIG. 8. The thin film transistor substrate 200 according to the second embodiment is roughly same with the thin film transistor substrate 100 according to the first embodiment. The differences between the thin film transistor substrate 200 and the thin film transistor substrate 100 are described below. A third metal layer 260 according to the second embodiment is different from the third metal layer 160 according to the first embodiment. The third metal layer 260 defines a plurality of touch sensor areas 281 arranged in a matrix and interval from each other. Each of the touch sensor areas 281 includes a plurality of first metal wires 261 extending along a first direction X and a plurality of second metal wires 262 extending along a second direction Y. The first metal wires 261 and the second metal wires 262 are arranged across and define a plurality of touch sensors 282. Areas of the touch sensors 282 are gradually reduced along a direction extended to the readout circuit 290. Each of the touch sensors 282 includes a first metal wire 261a extend from the touch sensor 282 to the readout circuit 290. Each of the first metal wires 261a are located at the same side of the touch sensors 282 in one row. In this embodiment, each of the first metal wires 261a are located at the left side of the touch sensors 282 in one row. In this embodiment, the second transparent layer 270 does not need to include the transparent conductive wires 173 of the first embodiment.

Figure 9:
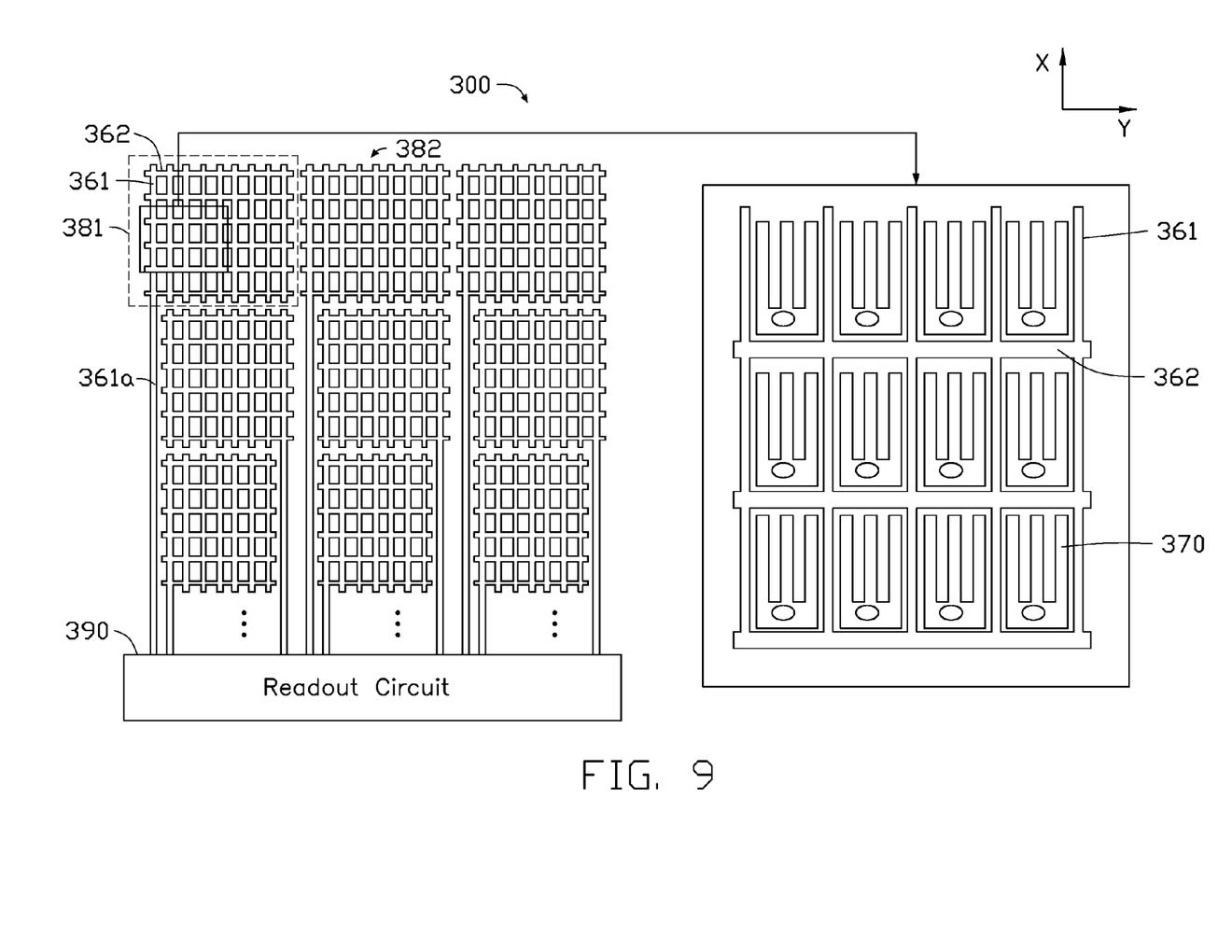
FIG. 9 and FIG. 10 are plan views of a thin film transistor substrate of the in-cell touch display panel according to a third embodiment of the present disclosure.
Figure 10:
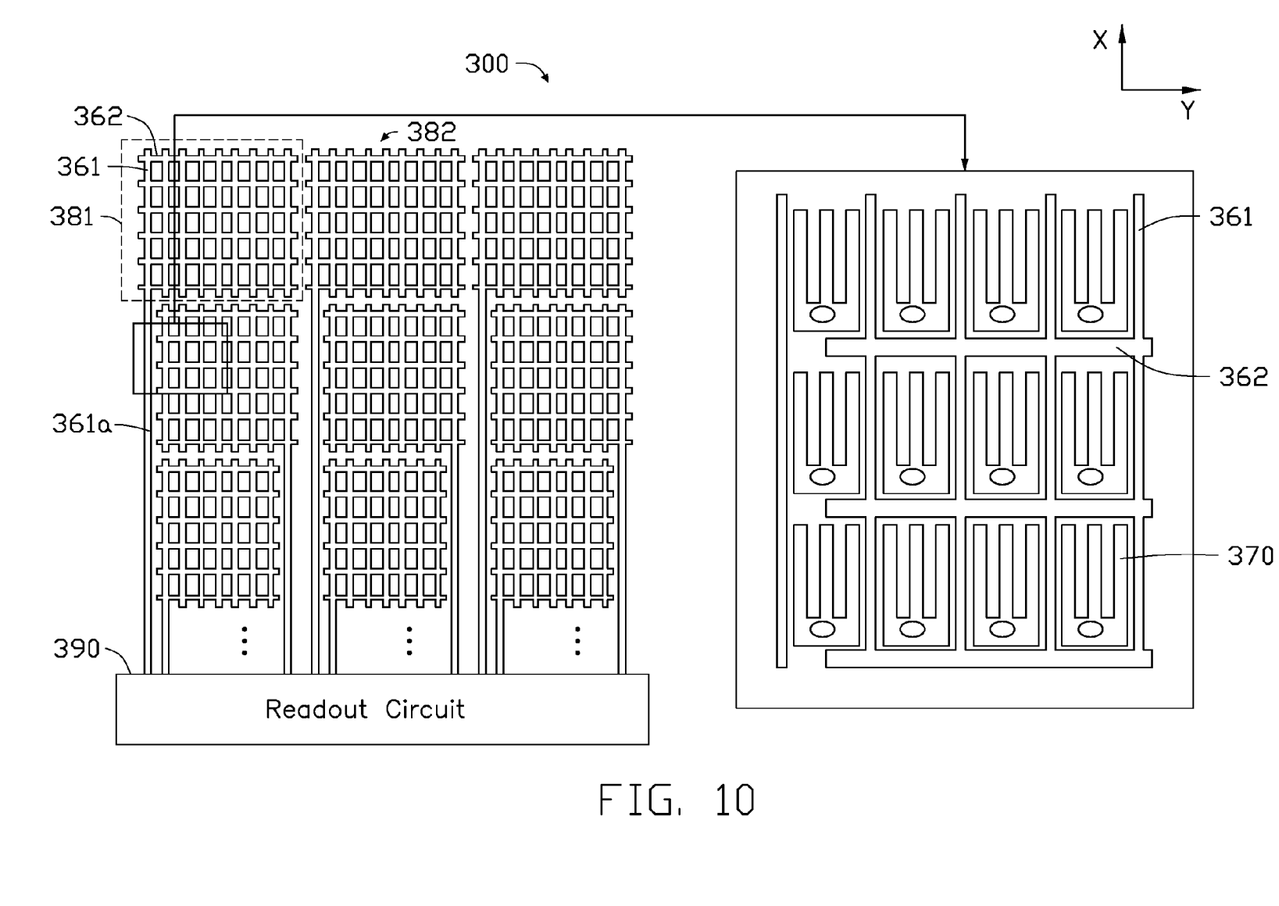

FIG. 9 and FIG. 10 are plan views of a thin film transistor substrate 300 of the in-cell touch display panel according to a third embodiment of the present disclosure. A right-hand portion is an enlarged view of a left-hand portion on each of the FIG. 9 and FIG. 10. The thin film transistor substrate 300 according to the third embodiment is roughly same with the thin film transistor substrate 100 according to the first embodiment. The differences between the thin film transistor substrate 300 and the thin film transistor substrate 100 are described below. A third metal layer 360 according to the third embodiment is different from the third metal layer 160 according to the first embodiment. The third metal layer 360 defines a plurality of touch sensor areas 381 arranged in a matrix and interval from each other. Each of the touch sensor areas 381 includes a plurality of first metal wires 361 extending along a first direction X and a plurality of second metal wires 362 extended along a second direction Y. The first metal wires 361 and the second metal wires 362 are arranged across and define a plurality of touch sensors 382. Areas of the touch sensors 382 are gradually reduced along a direction extended to the readout circuit 390. Each of the touch sensors 382 includes a first metal wire 361a extend from the touch sensor 382 to the readout circuit 390. The first metal wires 361a are located at two sides of the touch sensors 382 in one row. In this embodiment, a part of the first metal wires 361a are located at the left side of the touch sensors 382, the other part of the first metal wires 361a are located at the right side of the touch sensors 382. In this embodiment, the second transparent layer 370 does not need to include the transparent conductive wires 173 of the first embodiment.

Figure 11:
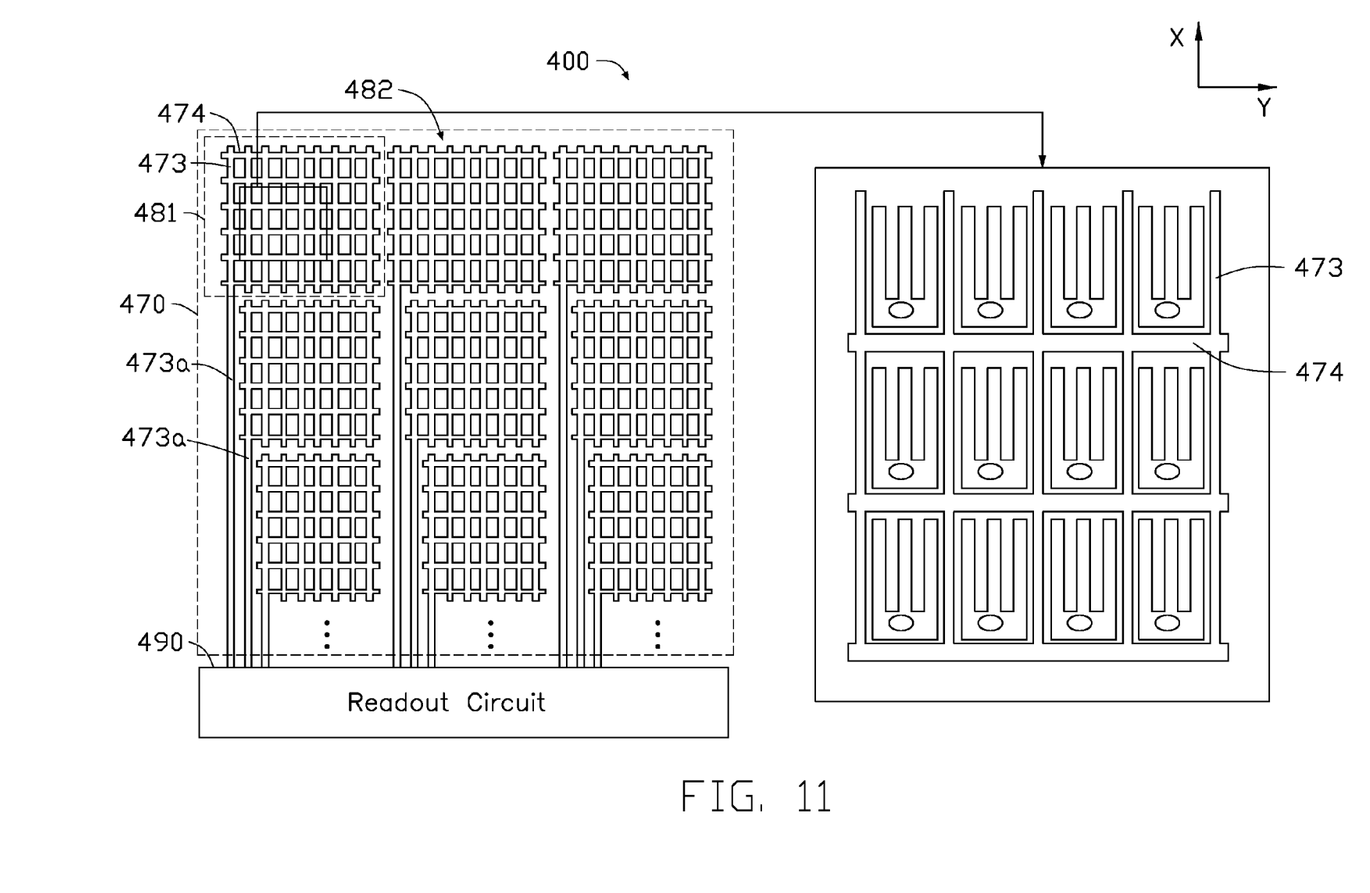
FIG. 11 and FIG. 12 are plan views of a thin film transistor substrate of the in-cell touch display panel according to a fourth embodiment of the present disclosure.
Figure 12:
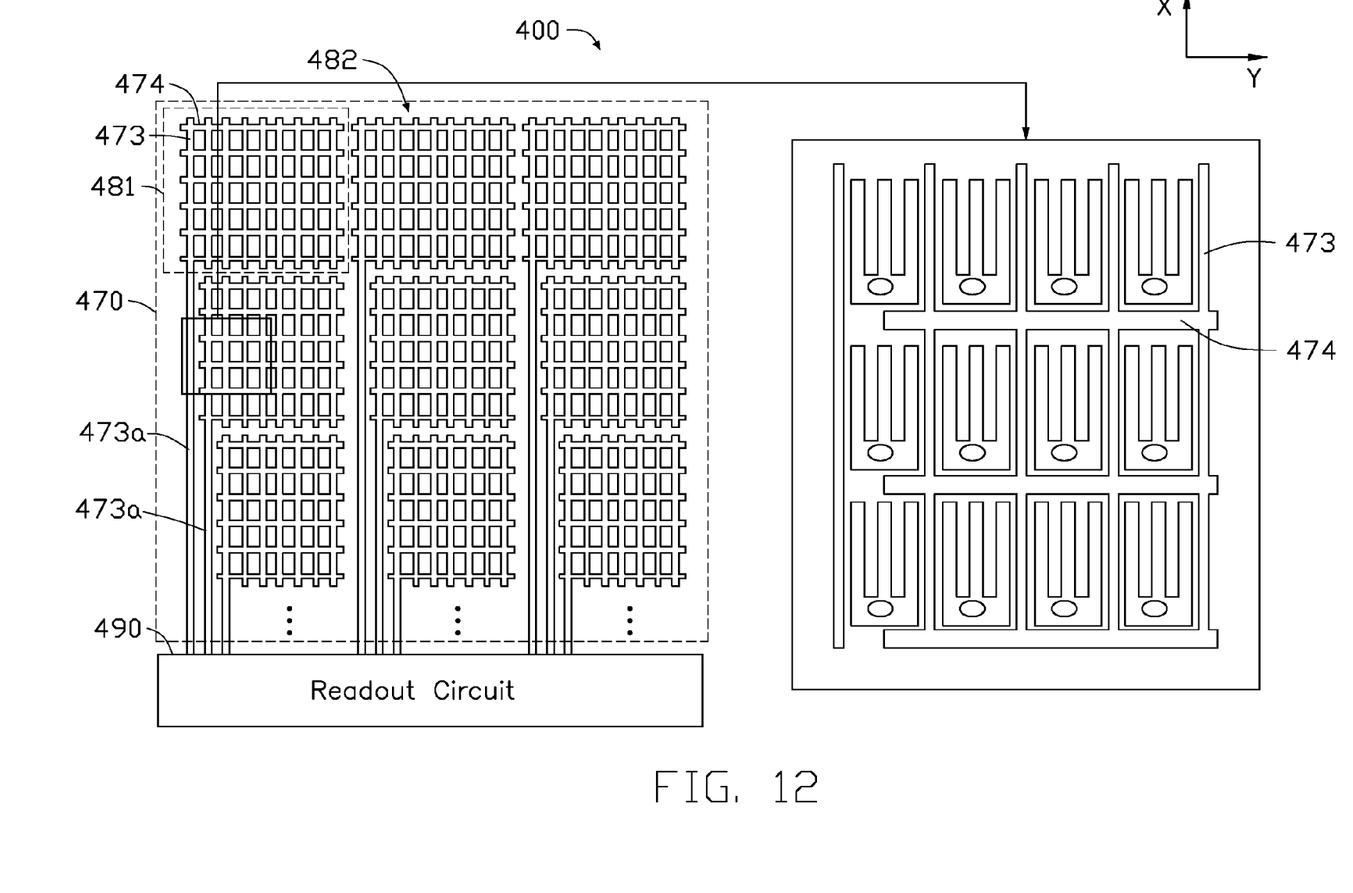

FIG. 11 and FIG. 12 are plan views of a thin film transistor substrate 400 of the in-cell touch display panel according to a fourth embodiment of the present disclosure. A right-hand portion is an enlarged view of a left-hand portion on each of the FIG. 11 and FIG. 12. The thin film transistor substrate 400 according to the fourth embodiment is roughly same with the thin film transistor substrate 100 according to the first embodiment. The differences between the thin film transistor substrate 400 and the thin film transistor substrate 100 are described below. A second transparent layer 470 according to the fourth embodiment is different from the second transparent layer 170 according to the first embodiment. The second transparent layer 470 defines a plurality of touch sensor areas 481 arranged in a matrix and interval from each other. Each of the touch sensor areas 481 includes a plurality of first transparent conductive wires 473 extending along a first direction X and a plurality of second transparent conductive wires 474 extending along a second direction Y. The first transparent conductive wires 473 and the second transparent conductive wires 474 are arranged across and define a plurality of touch sensors 482. Areas of the touch sensors 482 are gradually reduced along a direction extended to the readout circuit 490. Each of the touch sensors 482 includes a first transparent conductive wire 473a extend from the touch sensor 482 to the readout circuit 490. Each of the first transparent conductive wires 473a are located at the same side of the touch sensors 482 in one row. In this embodiment, each of the first transparent conductive wires 473a are located at the left side of the touch sensors 482 in one row. In this embodiment, the third metal layer 460 does not need to include the metal wires 161 of the first embodiment.

Figure 13:
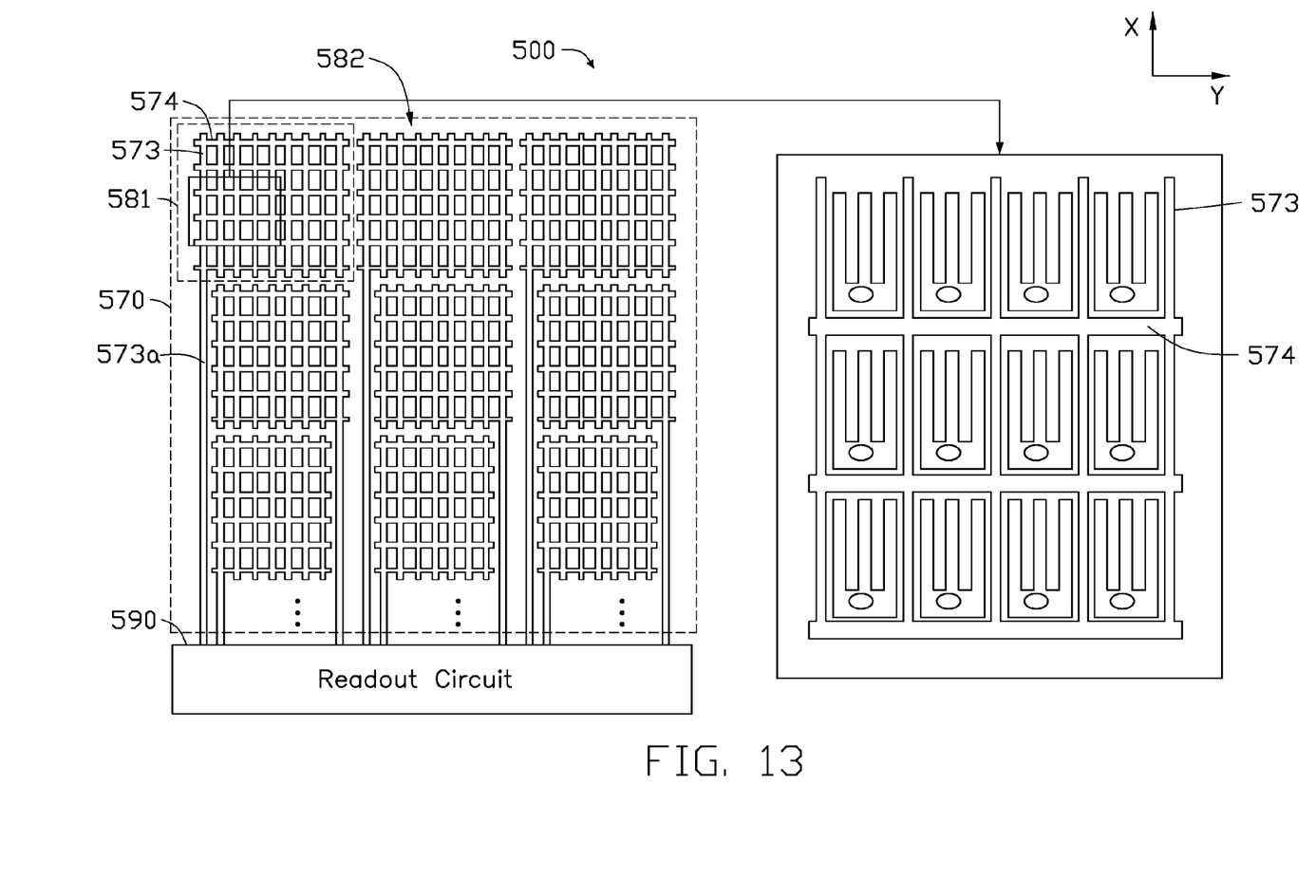
FIG. 13 and FIG. 14 are plan views of a thin film transistor substrate of the in-cell touch display panel according to a fifth embodiment of the present disclosure.
Figure 14:
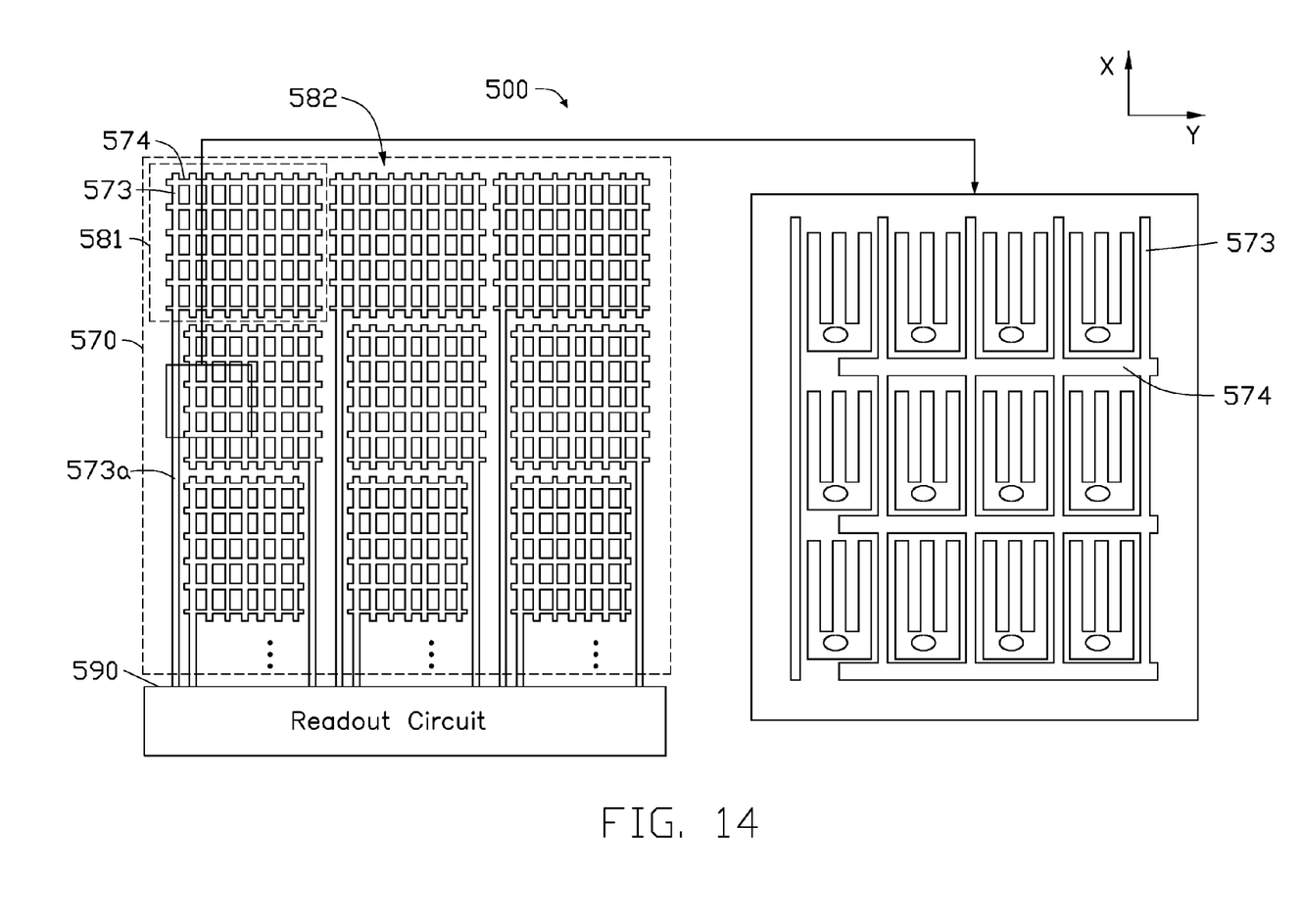

FIG. 13 and FIG. 14 are plan views of a thin film transistor substrate 500 of the in-cell touch display panel according to a fifth embodiment of the present disclosure. A right-hand portion is an enlarged view of a left-hand portion on each of the FIG. 13 and FIG. 14. The thin film transistor substrate 500 according to the fifth embodiment is roughly same with the thin film transistor substrate 100 according to the first embodiment. The differences between the thin film transistor substrate 500 and the thin film transistor substrate 100 are described below. A second transparent layer 570 according to the fifth embodiment is different from the second transparent layer 170 according to the first embodiment. The second transparent layer 570 defines a plurality of touch sensor areas 581 arranged in a matrix and interval from each other. Each of the touch sensor areas 581 includes a plurality of first transparent conductive wires 573 extending along a first direction X and a plurality of second transparent conductive wires 574 extending along a second direction Y. The first transparent conductive wires 53 and the second transparent conductive wires 574 are arranged across and define a plurality of touch sensors 582. Areas of the touch sensors 582 are gradually reduced along a direction extended to the readout circuit 590. Each of the touch sensors 582 includes a first transparent conductive wire 573a extend from the touch sensor 582 to the readout circuit 590. The first transparent conductive wires 573a are located at two sides of the touch sensors 582 in one row. In this embodiment, a part of the first transparent conductive wires 573a are located at the left side of the touch sensors 582. The other part of the transparent conductive wires 573a are located at the right side of the touch sensors 582. In this embodiment, the third metal layer 560 does not need to include the metal wires 161 of the first embodiment.

The embodiments shown and described above are only examples. Many details are often found in the art such as the other features of a structure and a panel using the structure. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A thin film transistor (TFT) substrate comprising:
   a first metal layer comprising at least one gate electrode;
   a second metal layer disposed over the first metal layer and insulated from the first metal layer, and the second metal layer comprises at least one source electrode and at least one drain electrode;

a first transparent layer disposed over the second metal layer and insulated from the first metal layer and the second metal layer, and the first transparent layer comprises at least one common electrode layer;

a third metal layer disposed over the first transparent layer and comprising a plurality of metal wires, each of the plurality of metal wires electrically connected to the common electrode layer; and a second transparent layer disposed over the third metal layer and comprising a plurality of transparent conductive wires, each of the plurality of transparent conductive wires electrically connected to the drain electrode, wherein the plurality of metal wires and the plurality of transparent conductive wires form a touch sensing structure configured to detect touch operations; the plurality of metal wires is made of metal; the plurality of transparent conductive wires is made of a transparent metal oxide; the plurality of transparent conductive wires is stacked on the plurality of metal wires.

2. The TFT substrate of claim 1, wherein the second transparent layer further comprises at least one pixel electrode electrically connected to the drain electrode, the pixel electrode defines a plurality of slits, the pixel electrode and the common electrode layer form a horizontal electric field.

3. The TFT substrate of claim 1, wherein the first metal layer further comprises plurality of gate lines electrically connected to the gate electrode, the second metal layer further comprises plurality of data lines electrically connected to the source electrode, the metal wires are roughly parallel to the data lines, the transparent conductive wires are roughly parallel to the gate lines.

4. The TFT substrate of claim 1, wherein the metal wires and the transparent conductive wires define a plurality of touch sensor areas, each of the touch sensor areas is a rectangle roughly; the touch sensor areas are arranged in a matrix and interval from each other, in each touch sensor area, the transparent conductive wires and the metal wires are arranged across and defined a plurality of touch sensors.

5. The TFT substrate of claim 4, the transparent conductive wires and the metal wires are electrically connected each other at a position corresponding to an infall of the transparent conductive wires and the metal wires.

6. The TFT substrate of claim 5, wherein the TFT substrate further comprises a readout circuit configured to detect a touch operation position; the metal wires are electrically connected to the touch sensors and the readout circuit.

7. The TFT substrate of claim 6, wherein the touch sensor areas comprises a first touch sensor area and a second sensor area located between the first touch sensor area and the readout circuit, at least one of the metal wires of the second touch sensor area is not electrically connected to a transparent conductive wire of the second touch sensor area, the at least one of the metal wires is extended from one of the metal wires of the first touch sensor area.

8. An in-cell touch display panel, comprising:
a thin film transistor (TFT) substrate, comprising:
a first metal layer comprising at least one gate electrode;
a second metal layer disposed over the first metal layer and insulated from the first metal layer, and the second metal layer comprises at least one source electrode and at least one drain electrode;

a first transparent layer disposed over the second metal layer and insulated from the first metal layer and the second metal layer, and the first transparent layer comprises at least one common electrode layer;

a third metal layer disposed over the first transparent layer and comprising a plurality of metal wires, each of the plurality of metal wires electrically connected to the common electrode layer; and a second transparent layer disposed over the third metal layer and comprising a plurality of transparent conductive wires, each of the plurality of transparent conductive wires electrically connected to the drain electrode, wherein the plurality of metal wires and the plurality of transparent conductive wires form a touch sensing structure configured to detect touch operations; the plurality of metal wires is made of metal; the plurality of transparent conductive wires is made of a transparent metal oxide; the plurality of transparent conductive wires is stacked on the plurality of metal wires.

9. The in-cell touch display panel of claim 8, wherein second transparent layer further comprises at least one pixel electrode electrically connected to the drain electrode, the pixel electrode defines a plurality of slits, the pixel electrode and the common electrode layer form a horizontal electric field.

10. The in-cell touch display panel of claim 8, wherein the first metal layer further comprises plurality of gate lines electrically connected to the gate electrode, the second metal layer further comprises plurality of data lines electrically connected to the source electrode, the metal wires are roughly parallel to the data lines, the transparent conductive wires are roughly parallel to the gate lines.

11. The in-cell touch display panel of claim 8, wherein the metal wires and the transparent conductive wires define a plurality of touch sensor areas, each of the touch sensor areas is a rectangle roughly; the touch sensor areas are arranged in a matrix and interval from each other, in each touch sensor area, the transparent conductive wires and the metal wires are arranged across and defined a plurality of touch sensors.

12. The in-cell touch display panel of claim 11, the transparent conductive wires and the metal wires are electrically connected each other at a position corresponding to an infall of the transparent conductive wires and the metal wires.

13. The in-cell touch display panel of claim 12, wherein the TFT substrate further comprises a readout circuit configured to detect a touch operation position; the metal wires are electrically connected to the touch sensors and the readout circuit.

14. The in-cell touch display panel of claim 12, wherein the touch sensor areas comprises a first touch sensor area and a second sensor area located between the first touch sensor area and the readout circuit, at least one of the metal wires of the second touch sensor area is not electrically connected to a transparent conductive wire of the second touch sensor area, the at least one of the metal wires is extended from one of the metal wires of the first touch sensor area.

* * * * *